(12) United States Patent
Poulsen et al.

(10) Patent No.: US 8,932,000 B2
(45) Date of Patent: Jan. 13, 2015

(54) METHODS FOR POSITIONING A LARGE LOAD INTO A TRANSPORT POSITION AND FOR POSITIONING A LARGE LOAD INTO A STORAGE POSITION, TRAILER AND/OR LORRY

(75) Inventors: Henning Poulsen, Skjern (DK); Jan Emil Westergaard, Brande (DK)

(73) Assignee: Siemens Aktiengesellschaft, München (DE)

( * ) Notice: Subject to any disclaimer, the term of this patent is extended or adjusted under 35 U.S.C. 154(b) by 468 days.

(21) Appl. No.: 13/084,958

(22) Filed: Apr. 12, 2011

(65) Prior Publication Data

US 2011/0268541 A1    Nov. 3, 2011

(30) Foreign Application Priority Data

Apr. 28, 2010 (EP) .................................... 10161253

(51) Int. Cl.
*B65G 67/00* (2006.01)
*B60P 1/64* (2006.01)
*B65G 7/02* (2006.01)

(52) U.S. Cl.
CPC ................. *B60P 1/6445* (2013.01); *B65G 7/02* (2013.01)
USPC ........................................................ 414/809

(58) Field of Classification Search
USPC ........ 280/404; 254/93 R, 93 VA, 93 L, 93 H; 248/163.1, 163.2, 121, 125.8, 157; 414/391, 495, 498, 608, 785, 812, 809
See application file for complete search history.

(56) References Cited

U.S. PATENT DOCUMENTS

| | | | | |
|---|---|---|---|---|
| 3,119,503 A | * | 1/1964 | Herpich et al. | 414/495 |
| 3,255,906 A | * | 6/1966 | Proler et al. | 414/458 |
| 3,261,488 A | * | 7/1966 | Van Raden | 414/498 |
| 3,362,552 A | * | 1/1968 | Thiele | 414/469 |
| 3,425,576 A | * | 2/1969 | Martin | 414/498 |
| 3,460,697 A | * | 8/1969 | Cowlishaw et al. | 414/498 |
| 3,520,433 A | * | 7/1970 | Blackburn | 414/498 |
| 3,612,315 A | * | 10/1971 | Blackburn | 414/495 |
| 3,719,299 A | * | 3/1973 | Oehler | 414/495 |
| 3,724,697 A | * | 4/1973 | Arvidsson | 414/495 |
| 4,053,072 A | * | 10/1977 | Ross et al. | 414/495 |
| 4,053,073 A | * | 10/1977 | Franchin | 414/495 |
| 4,200,305 A | * | 4/1980 | Eubank | 280/404 |
| 5,417,540 A | * | 5/1995 | Cox | 414/495 |

(Continued)

FOREIGN PATENT DOCUMENTS

| | | |
|---|---|---|
| DE | 3334656 A1 | 4/1985 |
| DE | 3534696 A1 | 4/1987 |

(Continued)

*Primary Examiner* — Saul Rodriguez
*Assistant Examiner* — Glenn Myers

(57) ABSTRACT

A method for positioning a large load into a transport position is provided. According to the method, the load is placed upon a frame structure with a substantially horizontal extension. The raising device is placed transport plane underneath the frame structure. The raising device is then extended in a vertical extension reaching between the transport plane and the frame structure so that the frame structure and the load are raised above the transport plane and are held in position by the raising device. Subsequently, the vertical extension of the raising device is decreased into the transport position. Further, a method for positioning a large load into a storage position and a transport system for such methods are also provided.

13 Claims, 6 Drawing Sheets

(56) References Cited

U.S. PATENT DOCUMENTS

| | | | |
|---|---|---|---|
| 5,624,225 A * | 4/1997 | Cox | 414/495 |
| 5,795,123 A * | 8/1998 | Lovgren | 414/343 |
| 2007/0145181 A1* | 6/2007 | Pedersen | 244/16 |
| 2010/0013239 A1* | 1/2010 | Damgaard et al. | 290/55 |

FOREIGN PATENT DOCUMENTS

| | | |
|---|---|---|
| DE | 29518569 U1 | 2/1996 |
| DE | 19818875 A1 | 11/1999 |
| DE | 10019832 A1 | 10/2001 |
| WO | WO2008.000267 A1 | 1/2008 |

* cited by examiner

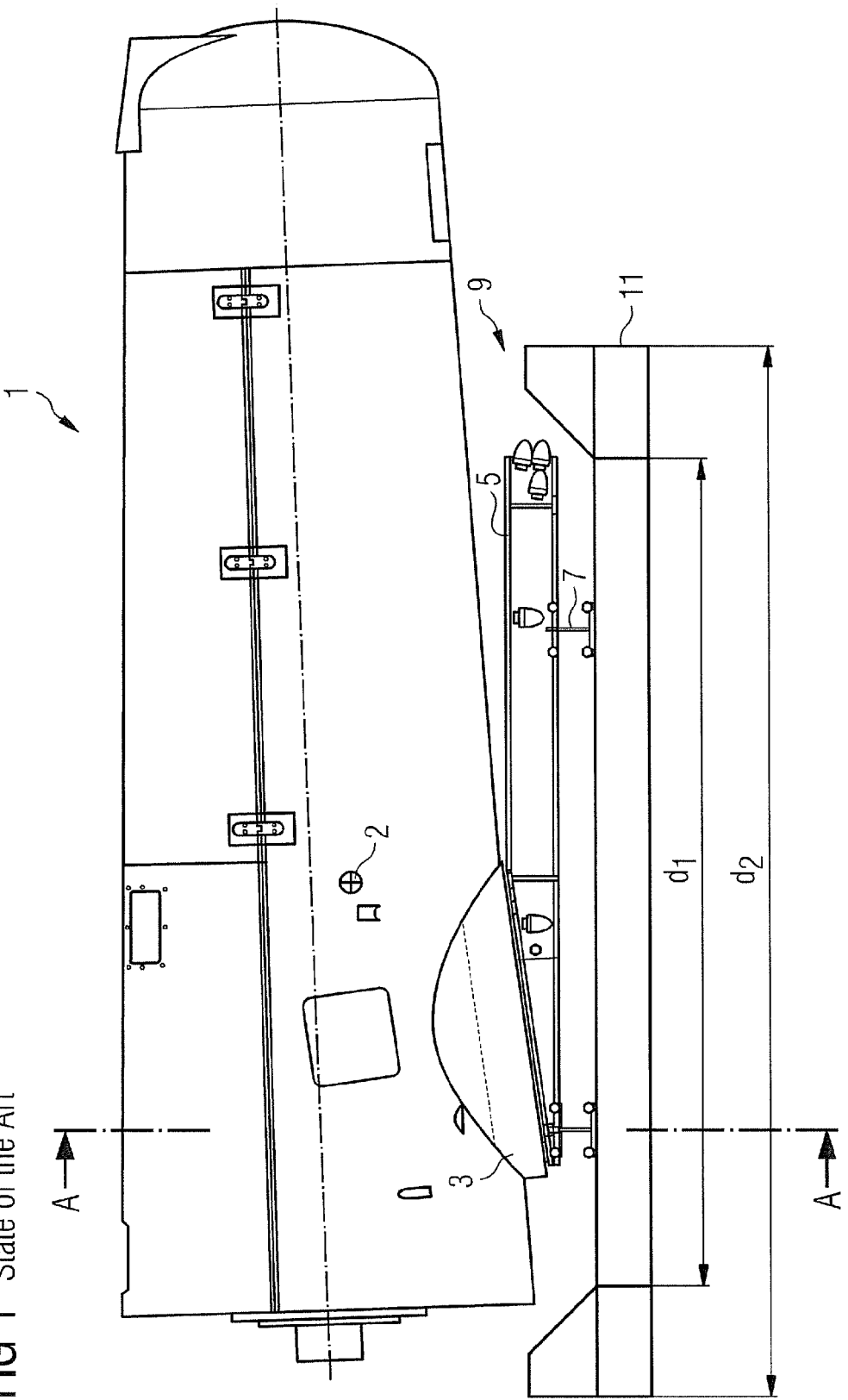

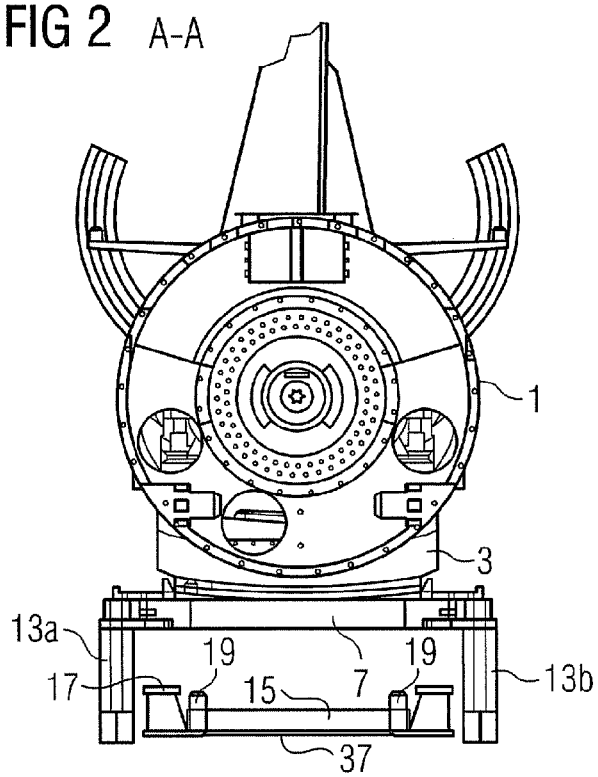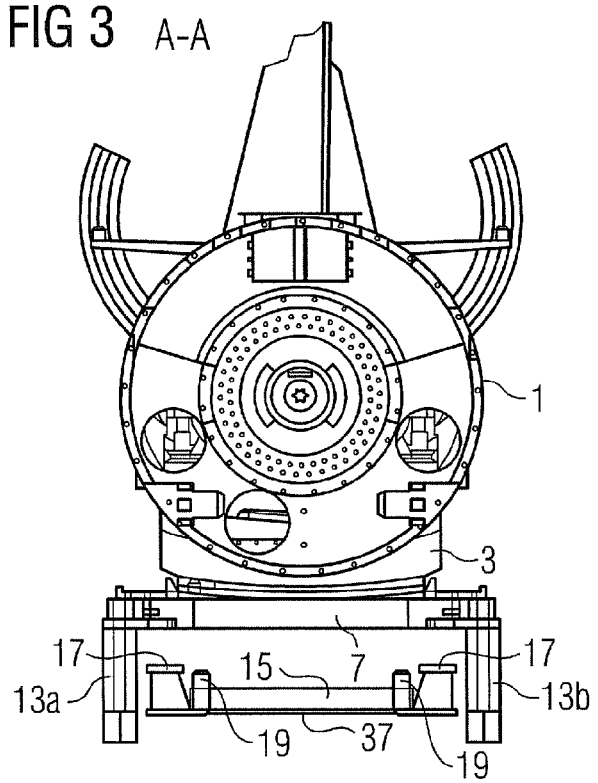

FIG 4 A-A
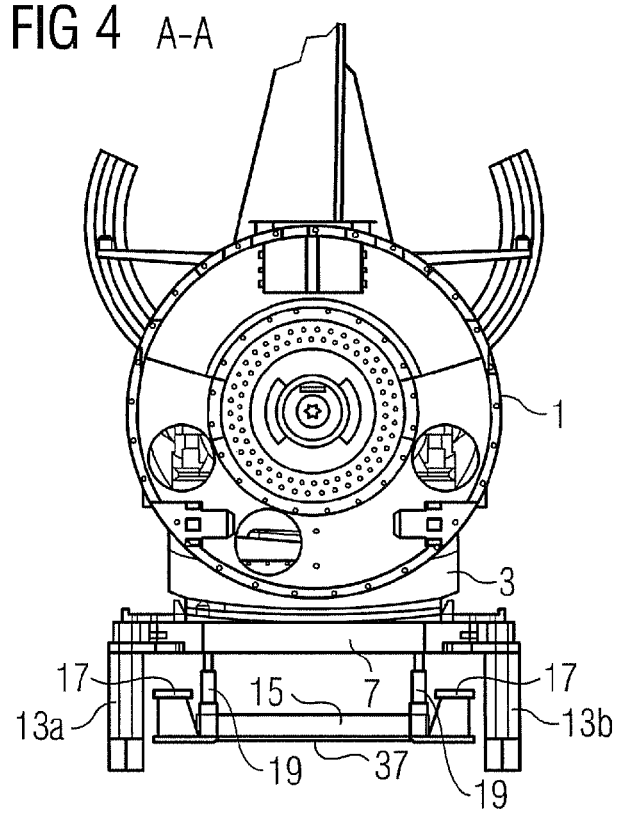
FIG 5 A-A
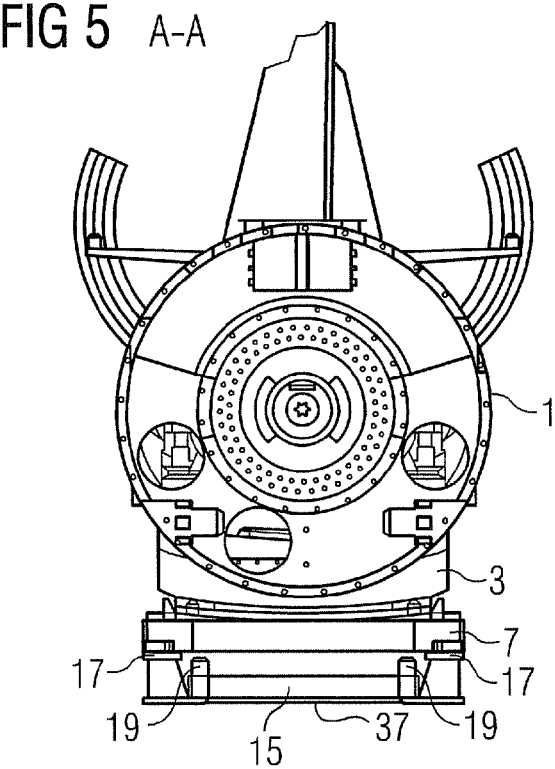

FIG 6
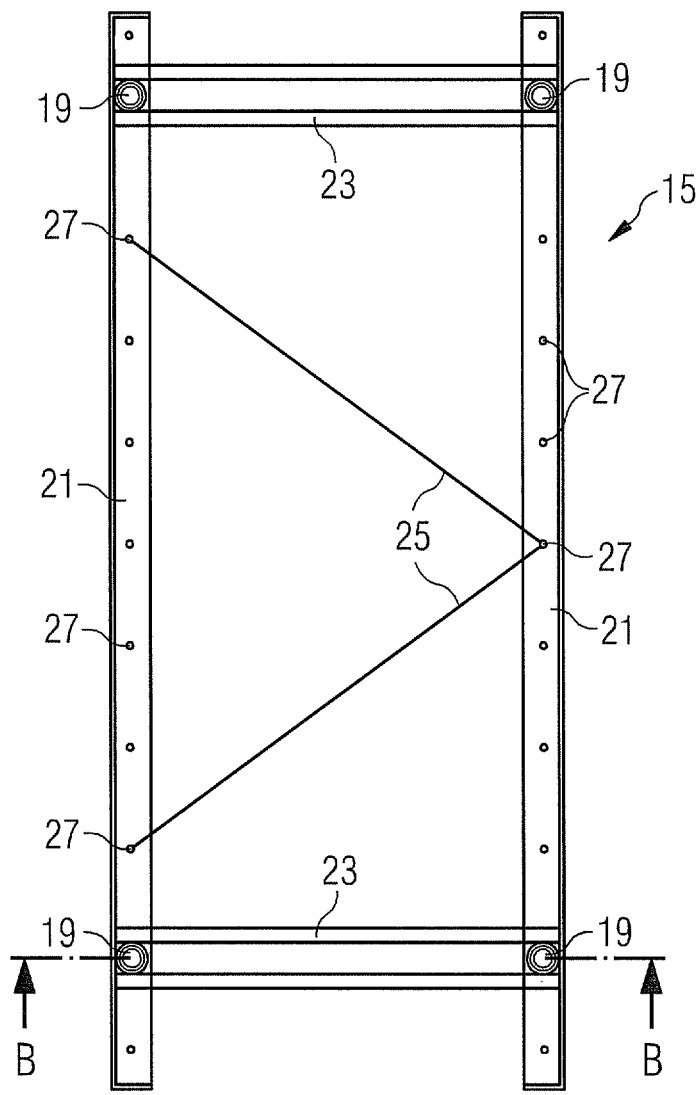
FIG 7  B-B
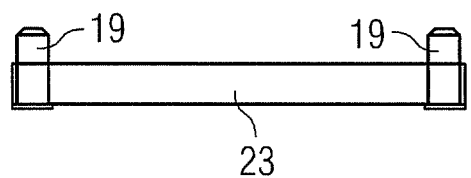

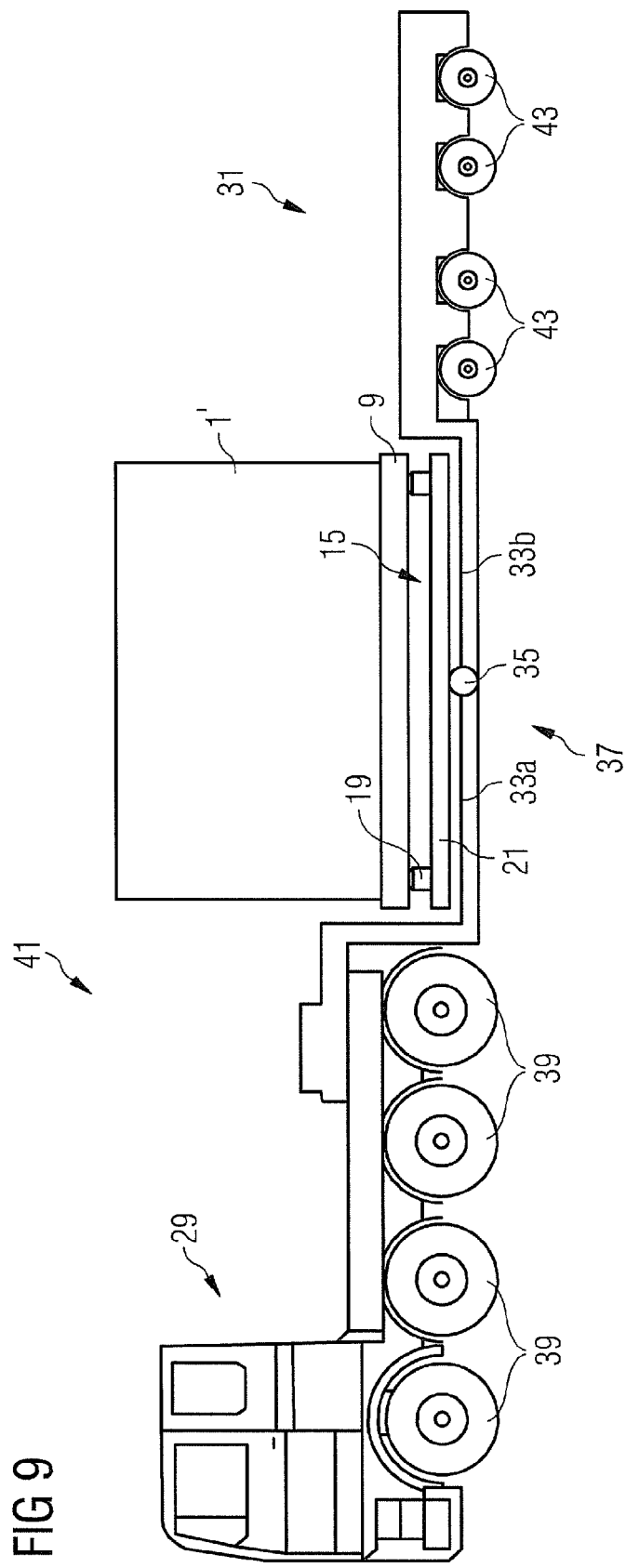

US 8,932,000 B2

METHODS FOR POSITIONING A LARGE LOAD INTO A TRANSPORT POSITION AND FOR POSITIONING A LARGE LOAD INTO A STORAGE POSITION, TRAILER AND/OR LORRY

CROSS REFERENCE TO RELATED APPLICATIONS

This application claims priority of European Patent Office application No. 10161253.9 EP filed Apr. 28, 2010, which is incorporated by reference herein in its entirety.

FIELD OF INVENTION

The present invention concerns a method for positioning a large load into a transport position, preferably on a means of transport, the load being placed upon a frame structure with an essentially horizontal extension, that frame structure preferably being held above ground by a number of vertical structures. A "transport position" is defined thereby to be such a position in which the load is safely situated on a means of transport or a kind of pre-position in between a storage position and a final position on the means of transport.

The invention also concerns a method for positioning a large load into a storage position after a transport, the load being placed upon a frame structure with an essentially horizontal extension. A "storage position" is thereby defined to be such a position in which the load can be stored in a storage area such as a yard or the like, but also an intermediate position from which the load is put into a final storage position or from which the load is transported furtheron later. Furthermore, the invention concerns a trailer and/or lorry comprising a transport plane and also concerns a transport system.

BACKGROUND OF INVENTION

The transport and storage of large loads is a particular challenge to the transport, respectively storage, industry. This is even more so if the loads due to their extension and/or non-uniformity do not fit into any packaging system such as containers and/or if the loads are particularly heavy, i.e. above the weight that can be carried by normally-sized lorries.

An example of such large and very heavy loads are large components of wind turbines such as tower segments, rotor blades and nacelles. All of them have a substantial weight and do not fit into regularly-sized standard containers. In effect they are transported openly, i.e. their principal shape is visible during transport. For the purpose of illustration, in the following reference is only made to wind turbine nacelles, bearing in mind that this invention is also particularly useful for the other wind turbine components mentioned and indeed for other similarly bulky loads as well.

A wind turbine nacelle is typically installed on a transport and storage frame structure on which the nacelle rests stably. Such frame structure according to the state of the art is depicted in FIG. 1: A wind turbine nacelle 1 with a bottom opening 3 is loaded onto a frame structure 9 comprising a longitudinal frame 5 and two cross beams 7 to which the longitudunal frame 5 is connected fixedly. The nacelle 1 is removably fixed on the frame structure 9 in the region of the bottom opening 3 in a stable way, i.e. its point of gravity 2 is positioned such with respect to the frame structure 9 that no forward and backward and also no sideward movement of the nacelle 1 is to be expected. Additionally, the nacelle can be bolted to the frame structure 9 to add stability. When assembled, the opening 3 serves as an inlet for the tower (not shown) of the wind turbine.

According to the state of the art, the nacelle 1 together with the frame structure 9 is loaded on a loading device 11 which is shaped like a trough having an inner longitudinal extension $d_1$ of approximately 7 meters and an outer longitudinal extension $d_2$ of approximately 8.9 meters.

To transport such construction comprising the nacelle 1, the frame structure and the loading device 11 on a local site such as a fabrication yard, a harbour area or when loading (respectively off-loading) it, e.g. on so-called roll-off-roll-on (ro-ro) boats, normally a transport crane is necessary. Such crane lifts the complete load from the ground onto e.g. a trailer or a lorry (before transport) or down therefrom (after transport, e.g. for further transport or installment). The use of such cranes is time-consuming and necessitates special equipment and extreme care during loading.

In WO 2008/000267 A1 there is disclosed a nacelle with raising means attached to it. Once lifted, the nacelle can be lowered onto a transport plane of a means of transport. That implies, however, that each nacelle must be equipped with such raising means and/or must comprise areas in which the raising means can be attached. This has the effect that such system is quite expensive and requires some extra equipment.

SUMMARY OF INVENTION

In this light, it is an object of the invention to provide a possibility of how a large load, in particular a wind turbine component, can be handled during and/or in preparation of and/or after transport in a simple and effective way.

This object is met by the features of the independent claims.

Accordingly, the above-mentioned method for positioning a large load, preferably a wind turbine component, into a transport position comprises the following steps:

placing a raising device on a ground and/or on a transport plane of the means of transport underneath the frame structure, extending the raising device in its vertical extension reaching between the ground and/or transport plane and the frame structure so that the frame structure together with the optional vertical structures and the load is raised above ground and the raising device holds them in position, optionally, i.e. as a preferred embodiment if such vertical structures are present, taking off the vertical structures, e.g. by removing connection bolts or other connection means which connect the vertical structures to the frame structure, decreasing the vertical extension of the raising device into the transport position. This way, the load is in a transport position very little above the ground which means that its overall height is at a minimum.

Thus, the invention makes use of a system comprising both a raising device and in a preferred version vertical structures which can be attached and detached from the frame structure.

The raising device is positioned underneath the frame structure. The frame structure is positioned either on the ground or elevated from it, preferably resting on the vertical structures. At any event, some space underneath the frame structure must be available so that the raising device can be put underneath it. It may be noted that the placement of the raising device underneath the frame structure may have happened well before the start of the transport procedure, for instance during a longer storage of the load. It may, however, also be placed underneath the frame structure right during the process of preparation of the load for transport, i.e. in a direct context of the other steps named above.

The raising device is then activated, which means that it is extended so that it raises the frame structure, and with it the load and the optional vertical structures, thus making possible a detachment of the vertical structures if present. These vertical structures can then be taken off, at least in part, which means that their length, i.e. their vertical extension is reduced, preferably to zero. The result is that the frame structure with the load is held above ground completely by the raising device. By lowering the raising device, the frame structure and the load can be brought into the desired transport position, e.g. on a transport plane of a trailer and/or a lorry.

In an analogous way, such a load can be positioned into a storage position after a transport. A storage positioning method as mentioned above comprises the following steps:
  placing the frame structure with the large load on a raising device situated on a ground and/or on a transport plane of a means of transport,
  extending the raising device in its extension reaching between the ground and/or transport plane and the frame structure so that the frame structure together with the load is raised and the raising device holds them in position,
  preferably attaching a number of vertical structures to the frame structure,
  decreasing the vertical extension of the raising device into the storage position preferably so that the frame structure is held above ground by the vertical structures.

The storage positioning method thus uses essentially the same steps as the method for positioning a load into a transport position as previously described, only in the reverse way. It may be noted in the context of both methods according to the invention that the raising device need not necessarily be situated on a means of transport but may also be positioned on the ground, e.g. on vertical structures, from where the load is put into the transport position and/or where it is to be transferred for arriving in the storage position. This can be realized for example by a raising device the raising means of which protrude through openings in a transport plane of the means of transport so that the means of transport can be put underneath the frame structure or taken away from it while the raising device holds the load in an elevated position.

In effect, the invention also concerns the use of a raising device for raising a large load in the context of the above-described methods according to the invention.

The invention further comprises a transport method for transporting a large load comprising the following steps:
  a method for positioning a load into a transport position according to the invention in preparation of the transport and/or and a method for positioning a load into a storage position according to the invention as a way of finishing the transport and
  a transport process in which the load is moved from one place to another.

According to the invention, a trailer and/or lorry as mentioned above comprises a raising device which in its position on the transport plane is extendable in its vertical extension so that by means of the raising device a load can be raised and held in position. This raising device is preferably adapted in its size and/or shape such that it can be safely positioned on the transport plane. Such safe positioning implies at least that:
a) the raising device is firmly held on the transport plane. For instance, its shape can be such that it corresponds to a shape and/or position of a holding device on the transport plane.
b) the raising device does not project out of the overall profile of the means of transport such as would be defined by the loading gauge of a train or by comparable profiles of trailers or lorries.

The raising device is not necessarily permanently fixed to the transport plane of the means of transport but may be, for instance realized as jacks integrated into or mounted fixedly on the transport plane.

A transport system according to the invention comprises a means of transport, preferably a trailer and/or lorry according to the invention as explained above, and a number of raising means capable of performing a method for positioning a load into a transport position according to the invention and/or a method for positioning a load into a storage position according to the invention, respectively and a transport method according to the invention. Thereby, the raising means preferably comprise a raising device as described above positioned on the transport plane, and optionally additional means to raise the load. For example, the means of transport may already incorporate a raising structure such as a hydraulic lifting mechanism for raising its transport plane from a lower level to a higher level.

Particularly advantageous embodiments and features of the invention are given by the dependent claims, as revealed in the following description. Thereby, features revealed in the context of any of the methods may also be realized in the context of the other methods and/or of the trailer and/or lorry and/or transport system and the other way round unless explicitly stated otherwise.

Preferably, the frame structure comprises a number of longitudinal beams and/or a longitudinal frame orientated in parallel to a longitudinal extension of the load and a number of cross beams which are essentially perpendicularly orientated to the longitudinal beams and/or the longitudinal frame. Such frame structure stabilizes the load in both its longitudinal extension—by the longitudinal beams and/or frame—and its extension perpendicular to the longitudinal extension—by the cross beams. In addition, it is possible to attach the vertical structures at any end, be it the longitudinal end of the frame structure or the end of the cross beams, which latter is particularly preferred: This way, a transport plane can easily be driven underneath the frame structure along the length of the load and of the longitudinal frame, respectively beams. It may be possible in some circumstances to omit the steps of attaching or taking off vertical structures because they might be either not present or have such a shape and/or length that a removal and/or a subsequent re-attachment is not necessary. For example, the frame structure itself may be realized such that a raising device can be inserted underneath without the need for a vertical structure. Another possible example is that vertical structures have such little extension that they are no obstacle during transport of the load if they remain attached to the frame structure.

Concerning the vertical structures, it is preferred that they are comprised of legs that are detachable from and attachable to the frame structure. Again, an attachment of the vertical structures to the cross beams is most preferred for the above-given reasons. Legs, i.e. beams with one or several feet are preferred because they require little space so that a means of transport can be driven alongside of them. Thereby, the feet of one leg can be interconnected by a connection beam in order to provide more stability of the legs.

The raising device can be for example a kind of table with a plane horizontally orientated which can be raised e.g. hydraulically while remaining in its horizontal orientation. A particularly advantageous embodiment consists of a raising device which is comprised of a number of extendable, preferably hydraulic beams which are orientated vertically. The beams are preferably such that in operation they move synchronously in order to maintain the same level at all of their ends. For that purpose, it is particularly advantageous if the raising device comprises a control unit that monitors and/or synchronizes the movement of the beams. The beams can be positioned such that they connect to the frame structure at specially designated raising points, e.g. fitting into orifices the shape of which corresponds to the shape of the beams at their tip which meets the frame structure. In this embodiment, the frame structure is lifted at several discrete points which makes positioning of the raising device easier with respect to the frame structure. For example, the tips of the hydraulic beams may correspond in their position to the cross beams or to the longitudinal beams of the frame structure which makes sure that the load and the frame structure rest stably on the raising device.

According to one preferred embodiment of the invention, the raising device is non-stationary. This means that it is not permanently fixed either to the ground or to the means of transport on which it rests, so that it only rests there temporarily. A major advantage of such choice can be seen in the fact that the raising device can be used consecutively for lifting several loads on a site and/or on a means of transport because after the accomplishment of one job, it is again free to be transported elsewhere and to be used again. A means of transport does not need to be equipped with a stationary raising device which makes the overall equipment less complex and less costly. It is particularly preferred that the raising device is equipped with rollers at least one side, so that its transport can be carried out at ease without any additional device which would lift the raising device and take it away. Rather it can easily be torn away from its current site of operation to another site.

According to another preferred embodiment of the invention, the raising device is stationary on a transport plane of a means of transport. That can be advantageous in such cases, when the means of transport is mainly used for transport of such large loads. In such cases, due to the possibly very high weight of such raising devices, loading and unloading of the raising devices onto and from the transport plane may prove too complicated so that it may be preferred to keep it on the means of transport on a constant basis. In such case, the raising device may be permanently fixed to the transport plane.

While different means of transport can play a role in any of the methods according to the invention, it is preferred that the means of transport is a trailer and/or a lorry with a transport plane upon which the raising device is positioned and which transport plane is moved underneath the frame structure. A trailer or lorry can manoeuvre relatively freely so that its transport plane can be positioned easily underneath the frame structure. In addition, a lorry or trailer can support the raising process: preferably, the transport plane of the trailer and/or lorry is raised or lowered functionally independently from the raising device. Thus raising and/or lowering the load on the frame structure can be accomplished in a combined way, one part of the raising action done by the raising device, the other part by the trailer and/or lorry.

Preferably, when using a trailer and/or lorry, the transport plane is divided into at least two plane parts, a first plane part being part of a first trailer and/or lorry and a second plane part being part of a second trailer and/or lorry, which plane parts are joined together underneath the frame structure. This means that the first plane part is directed underneath the frame structure from a first end—preferably a first longitudinal end—and the second plane part from a second end which is the opposite end of the load. Underneath the frame structure, those two parts are joined together so that they form a uniform plane structure together. The transport plane may also comprise more than two plane parts, e.g. three plane parts whereby one plane part may be realized as a middle part which joins the first and the second plane parts together or the like. Alternatively, the transport plane may be part of either a trailer or a lorry. The trailer or lorry with the transport plane can then be joined at an end of the transport plane to a lorry or trailer with no transport plane thus forming a unit comprising both a trailer and a lorry and with the transport plane in between them as the connecting element.

It must be explicitly noted that the method for positioning a load into a storage position according to the invention can be further enhanced by any of the features described above with respect to the method for positioning such load in a transport position. The advantages can be seen in analogy to those of the latter method.

Concerning the transport method, according to a preferred embodiment the vertical structures are both detached and attached from and to the frame structure, whereby the vertical extensions of the vertical structures detached are different to the vertical extensions of the vertical structures attached. This means that the load is initially positioned at a different level of height than after the transport method. The vertical extensions of the vertical structures, reference to which is made in this context, are measured from the ground and/or the transport plane of a means of transport to an attachment point at which the vertical structures are attached to the transport frame. For instance, small vertical extensions, in particular legs, can be used in the storage position in combination with transport cassettes which can then be used as sea-fastenings on ro-ro boats.

Concerning the raising means of the transport system according to the invention, it preferably comprises a raising device, most preferably a raising frame with at least one longitudinal beam and at least one cross beam and with beams extendable in length which project from the frame plane of the raising frame. Such rather simple construction, the extendable beams of which are preferably realized as hydraulic beams, is rather easy to manufacture and to transport and can be adjusted in its shape by positioning the longitudinal and cross beam(s) in such a way that their positions correspond with the surface of the transport plane.

Other objects and features of the present invention will become apparent from the following detailed descriptions considered in conjunction with the accompanying drawings. It is to be understood, however, that the drawings are designed solely for the purposes of illustration and not as a definition of the limits of the invention.

BRIEF DESCRIPTION OF THE DRAWINGS

In the drawings, like reference numbers refer to like objects throughout. Objects in the diagrams are not necessarily drawn to scale.

FIG. 1 shows in a side view of a nacelle on a transport frame according to the state of the art, FIG. 2 shows a section view along a line A-A of a nacelle on a different transport frame useable in the context of the invention in a first step according to an embodiment of a method according the invention, FIG. 3 shows the same section view as in FIG. 2 in a second step according to an embodiment of a method according the invention, FIG. 4 shows the same section view as in FIGS. 2 and 3 in a third step according to an embodiment of a method according the invention, FIG. 5 shows the same section view as in FIGS. 2 to 4 in a fourth step according to an embodiment of a method according the invention, FIG. 6 shows a top view of the raising device of FIGS. 2 to 5, FIG. 7 shows a section view along a line B-B in FIG. 6 of the same raising device, FIG. 9 shows a side view of a means of transport according to an embodiment of the invention.

DETAILED DESCRIPTION OF INVENTION

Figure 8:
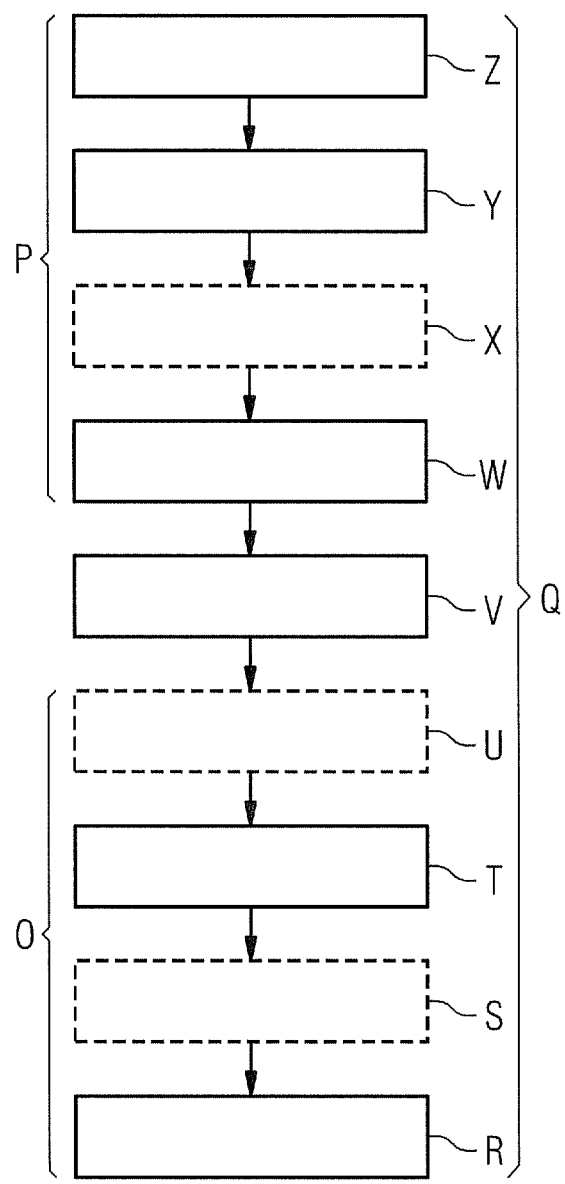
FIG. 8 shows a schematic block diagram of embodiments of all the different methods according to the invention.

FIG. 1 has already been explained above in the context of the description of the state of the art.

FIGS. 2 to 5 show four different steps or stages of an embodiment of both principal methods according to the invention: In a viewing direction from FIG. 2 to FIG. 5 there is shown a sequence of an embodiment of the method for positioning a large load into a transport position. In a viewing direction from FIG. 5 to FIG. 2 there is shown a sequence of an embodiment of the method for positioning a large load into a storage position.

Principally, all four drawings show the nacelle 1 with its bottom opening 3 being attached to the frame structure 9 of which, due to the cross-section, there can only be seen one cross beam 7. The frame structure 9 is the same as in FIG. 1. However, it is not held in a loading device like in FIG. 1, but rather standing on four legs as vertical structures, of which two legs 13a, 13b can be seen in the section view. These two legs 13a, 13b are attached to both ends of the cross beam 7—accordingly the other two legs are connected to the second cross beam which is hidden in the drawing. In between the legs 13a, 13b underneath the frame structure 9 there is a space in which a part of a means of transport, here a transport plane 37 of a lorry is inserted. The transport plane 37 ends on either side with longitudinal holder beams 17 in between which a raising frame 15 is positioned as a raising device. The holder beams 17 hold the raising frame 15 in position, whereas in other words the raising frame 15 is realized such that it is firmly held by the holder beams 17 of the transport plane 37. It may be noted in this context that to make up a transport plane 37, this can also be realized by the two holder beams 17 only, because these have a shape that defines a transport plane even without a plate or such being in between the two holder beams 17. The raising frame 15 comprises hydraulic beams 19 at all four ends, two of which can be seen in the section view.

Going from FIG. 2 to FIG. 5, the following sequence can be made out:

In FIG. 2, the transport plane 37 with the raising frame 15 is inserted underneath the cross beam 7. In FIG. 3, the transport plane 37 is raised by activating a lifting means incorporated in the lorry of which the transport plane 37 is a part. Thus, the raising frame 15 is also raised to a certain extent. In FIG. 4, the beams 19 of the raising frame are extended in length so that now, the cross beams 7 together with the nacelle and with the vertical legs 13a, 13b is raised above ground. Therefore, the nacelle 1 is raised above ground and the legs 13a, 13b are hanging down from the cross beams 7. They can now be detached from the cross beams 7. FIG. 5 shows the assembly without the legs 13a, 13b and with the hydraulic beams 19 lowered down to their previous position known from FIGS. 2 and 5. The cross beams 7 now rest on the holder beams 17, i.e. on the transport plane 37.

As mentioned before, this process can—after a transport of the nacelle 1 to another destination—be reversed so that an embodiment of the method for positioning a large load into a storage position—the position shown in FIG. 2—can be carried out.

FIG. 6 shows a top view of the raising frame 15. It comprises a couple of longitudinal beams 21 aligned in parallel and a couple of cross beams 23 also aligned in parallel. The longitudinal beams 21 show a line of through holes 27 which can be used to fix the cross beams 23 at different positions and also to fix a connecting wire 25 which interconnects diagonally the longitudinal beams 21 to give the shape of the raising frame 15 more stability by putting it under a certain tension. At any of the ends of the cross beams 23, thus aligned with the area where the cross beams 23 and the longitudinal beams 21 meet, the hydraulic beams 19 protrude out of the plane of the raising frame.

This can be seen clearer in the section view in FIG. 7 showing a section along a line B-B of FIG. 6.

FIG. 8 shows a schematic block diagram of an embodiment of a transport method Q according to the invention including both a method P for positioning a large load into a transport position and a method O for positioning it into a storage position, with a step V in between which step V comprises moving the transport good from one location to another.

The methods Q, P, O are described in the context of FIGS. 2 to 5. That implies that initially the large load, i.e. the nacelle 1 is placed on the frame structure 9. This frame structure 9 is held above ground by the legs 13a, 13b.

The method P for positioning the nacelle 1 into a transport position comprises a first step Z in which the raising frame 15 is placed underneath the frame structure 9. After that, in a step Y, the hydraulic beams 19 are extended (as can be seen in FIG. 4). This way the frame structure 9 is raised together with the nacelle 1. In an optional step X, the legs 13a, 13b are taken off while in a step W, the hydraulic beams 19 are driven back into their previous position. The nacelle 1 now rests on the transport plane 37 of the lorry and can be moved in step V.

The method O for positioning the nacelle 1 into a storage position includes a step U in which the nacelle 1 is placed on the raising device 15. This placement has happened already in the course of the previously described method P. In step T the hydraulic beams 19 of the raising device 15 are extended so that the frame structure 9 with the nacelle is elevated. In an optional step S the legs 13a, 13b are attached to the frame structure 9 and in step R, the hydraulic beams 19 are driven back into their initial position, so that now the nacelle 1 on the frame structure 9 rests on the ground again.

FIG. 9 shows in a side view a means of transport 41 according to an embodiment of the invention. The means of transport 41 is a low loader comprising as two sub-means of transport a lorry 29 and a trailer 31. The lorry 29 rests on four wheelsets 39, and the trailer 31 also rests on four wheelsets 43. Two transport planes 33a, 33b of the lorry 29 and the trailer are interconnected with a coupling 35 so as to form a combined transport plane 37. On this transport plane 37, there rests a raising frame 15 of the kind as described in the context of FIGS. 6 and 7 and thereupon a load 1' on a frame structure 9 both of which are just shown schematically. The load 1' in particular may take any shape, but the means of transport is particularly useful for the transport of wind turbine components as previously explained.

Although the present invention has been disclosed in the form of preferred embodiments and variations thereon, it will be understood that numerous additional modifications and variations could be made thereto without departing from the scope of the invention. While a nacelle was used as a basis for the description, the transport system according to the invention may be used to good effect in transporting any other large loads. The raising device can also be realized in a different form than that of a mere raising frame.

For the sake of clarity, it is to be understood that the use of "a" or "an" throughout this application does not exclude a plurality, and "comprising" does not exclude other steps or elements.

The invention claimed is:

1. A method for positioning a load into a transport position, comprising:
    placing the load upon a frame structure with a substantially horizontal extension;
    placing a raising device on a transport plane underneath the frame structure;
    extending the raising device in a vertical extension reaching between the transport plane and the frame structure so that the frame structure and the load are raised above the transport plane and are held in position by the raising device; and
    decreasing the vertical extension of the raising device into the transport position,
    wherein the transport plane is divided into at least a first plane part and a second plane part, the first plane part being disposed on a first transport vehicle and the second plane part being disposed on a second transport vehicle, the first and second plane parts being joined together underneath the frame structure;
    wherein at least a portion of the raising device is carried on each of the first and second transport plane parts,
    wherein at least a portion of the load is carried on the frame structure by each of the first and second transport plane parts.

2. The method according to claim 1, wherein the frame structure is held above a ground by a plurality of vertical structures resting on the ground, such that upon the extending of the raising device in the vertical extension reaching between the transport plane and the frame structure, the vertical structures, together with the frame structure and the load, are raised above the ground and are held in position by the raising device.

3. The method according to claim 2, further comprising taking off the vertical structures from the frame structure prior to the decreasing of the vertical extension of the raising device.

4. The method according to claim 2, wherein the vertical structures comprise legs, the legs being detachable from and attachable to the frame structure.

5. The method according to claim 1, wherein the transport plane is included in a transport system comprising at least one transport vehicle, said transport vehicle being a lorry or a trailer.

6. The method according to claim 5, wherein the transport plane of the transportation system is raised or lowered independently of the raising device.

7. The method according to claim 1, wherein the frame structure comprises a plurality of longitudinal beams and/or a longitudinal frame orientated in parallel to a longitudinal extension of the load, and a plurality of cross beams substantially perpendicularly orientated to the longitudinal beams and/or the longitudinal frame.

8. The method according to claim 1, wherein the raising device comprises a plurality of extendable hydraulic beams orientated vertically.

9. The method according claim 1, wherein the raising device is non-stationary.

10. The method according to claim 1, wherein the raising device is equipped with rollers at least at one side, for transportation of the raising device.

11. The method according to claim 1, wherein the load comprises a nacelle of a wind turbine.

12. A method for positioning a load into a storage position after a transport, comprising:
    placing the load upon a frame structure with a substantially horizontal extension;
    placing the frame structure with the load on a raising device situated on a transport plane;
    extending the raising device in a vertical extension reaching between transport plane and the frame structure so that the frame structure together with the load is raised and held in position by the raising device; and
    decreasing the vertical extension of the raising device into the storage position,
    wherein the transport plane is divided into at least a first plane part and a second plane part, the first plane part being disposed on a first transport vehicle and the second plane part being disposed on a second transport vehicle, the first and second plane parts being joined together underneath the frame structure,
    wherein at least a portion of the raising device is carried on each of the first and second transport plane parts,
    wherein at least a potion of the load is carried on the frame structure by each of the first and second transport plane parts.

13. The method according to claim 12, further comprising attaching a plurality of vertical structures to the frame structure prior to the decreasing of the vertical extension of the raising device, so that upon decreasing the vertical extension of the raising device, the frame structure is held above a ground by the vertical structures.

* * * * *